United States Patent [19]

Coetsier

[11] 4,311,386
[45] Jan. 19, 1982

[54] METHOD FOR CHECKING WHEEL ALIGNMENT OF FRONT AND REAR WHEEL SYSTEMS OF AUTOMOTIVE VEHICLES AND AN APPARATUS FOR CARRYING OUT SAID METHOD

[75] Inventor: Paul Coetsier, Chelles, France

[73] Assignee: Etablissements M. Muller & Cie, France

[21] Appl. No.: 126,861

[22] Filed: Feb. 28, 1980

[30] Foreign Application Priority Data

Mar. 9, 1979 [FR] France ............................ 79 06118

[51] Int. Cl.³ ..................... G01B 11/275; G01B 11/27
[52] U.S. Cl. ....................................... 356/155; 33/288
[58] Field of Search ............................ 356/152, 155; 33/203.15, 203.18, 228, 288

[56] References Cited

U.S. PATENT DOCUMENTS

| | | | |
|---|---|---|---|
| 3,782,831 | 1/1974 | Senften | 356/155 |
| 4,058,903 | 11/1977 | Wilkerson | 33/288 |
| 4,095,902 | 6/1978 | Florer et al. | 356/155 |
| 4,097,157 | 6/1978 | Lill | 356/155 |
| 4,106,208 | 8/1978 | Hunter | 33/288 |
| 4,239,389 | 12/1980 | Hollandsworth et al. | 356/155 |

*Primary Examiner*—William H. Punter
*Attorney, Agent, or Firm*—Michael J. Striker

[57] ABSTRACT

A laser beam emitter is placed at the level of each front wheel and a first laser beam is projected transversely in front of the vehicle onto a first receiver placed in front of the other front wheel. A second laser beam emerging from the same emitter is projected onto a reflecting mirror placed at the level of the corresponding rear wheel and the reflected laser beam is transmitted to a second receiver. The different distances read on the receivers are transmitted to the memory of an electronic computer which automatically determines the values of the angles of toe-in and toe-out of the front or rear wheels as well as the set-back or relative axial displacement between the front wheels.

3 Claims, 9 Drawing Figures

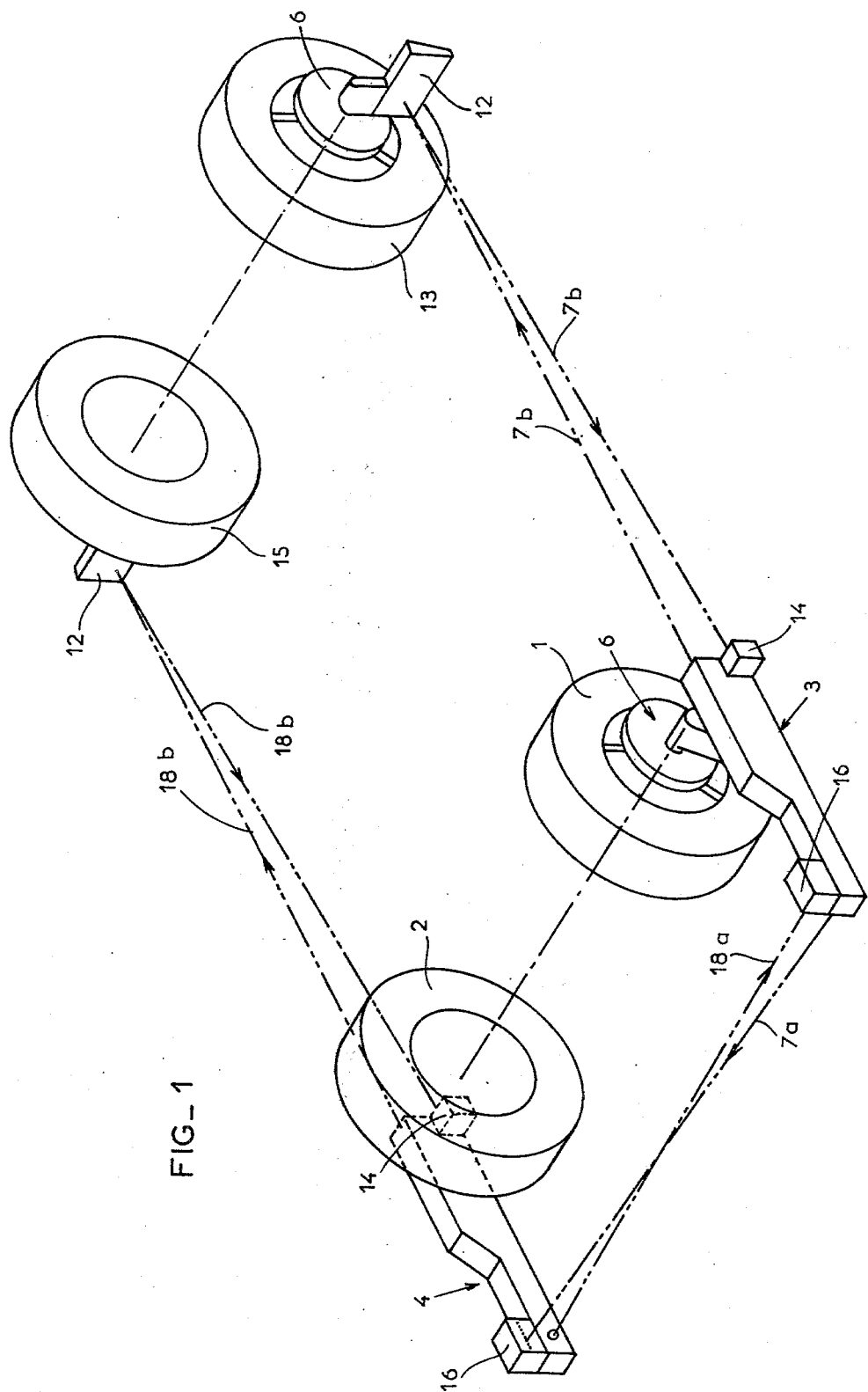

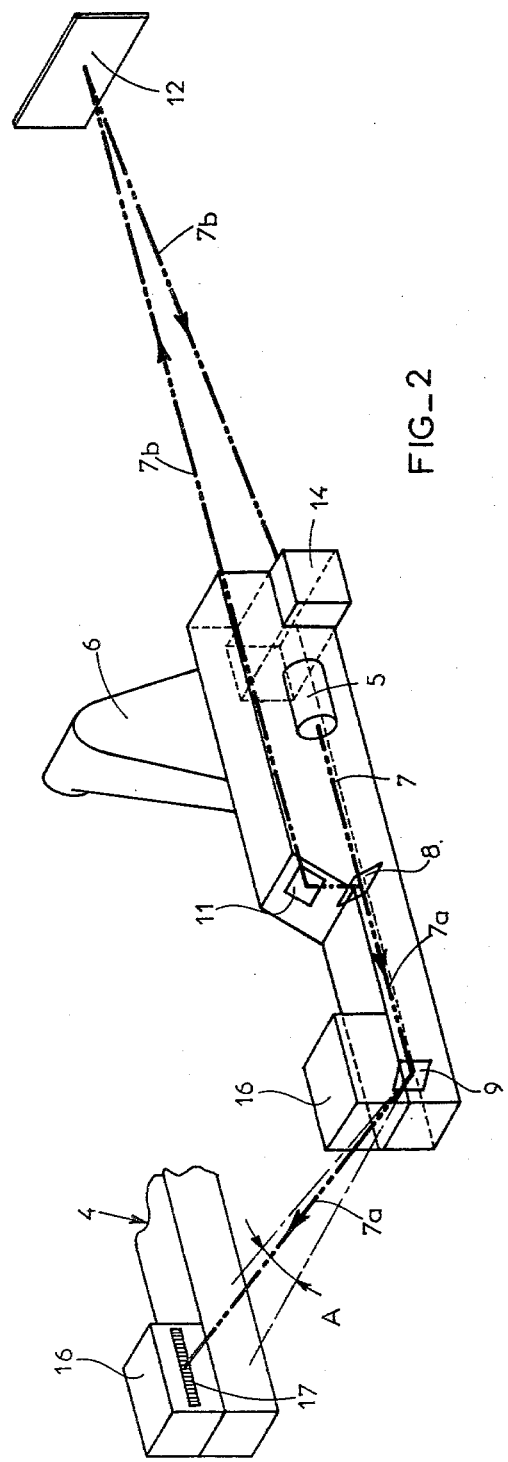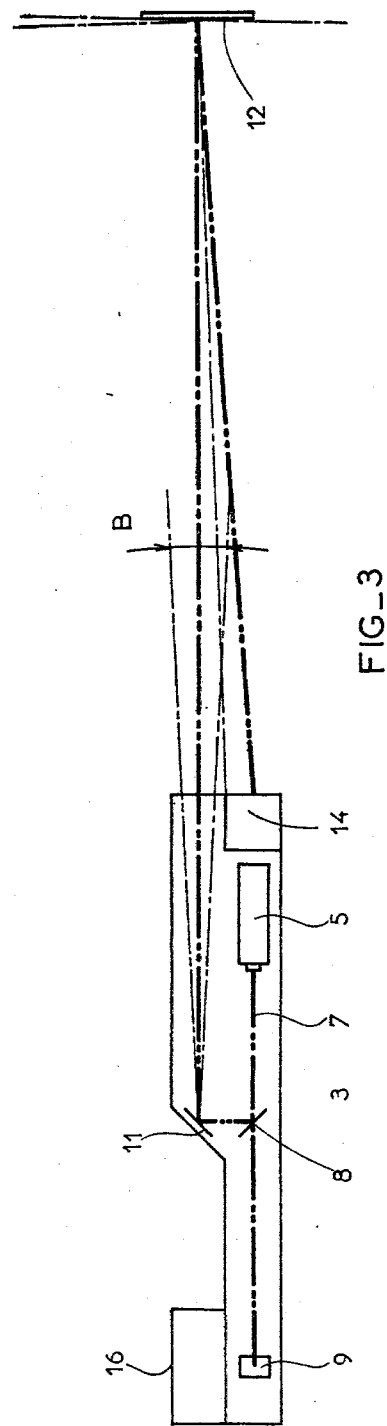
FIG_2
FIG_3

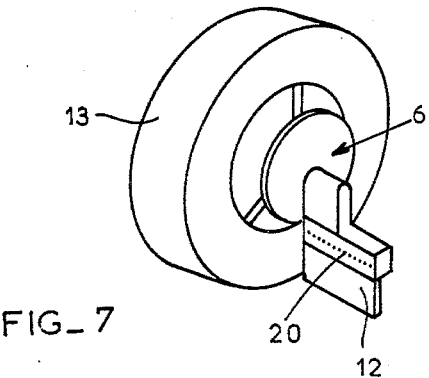
FIG_7
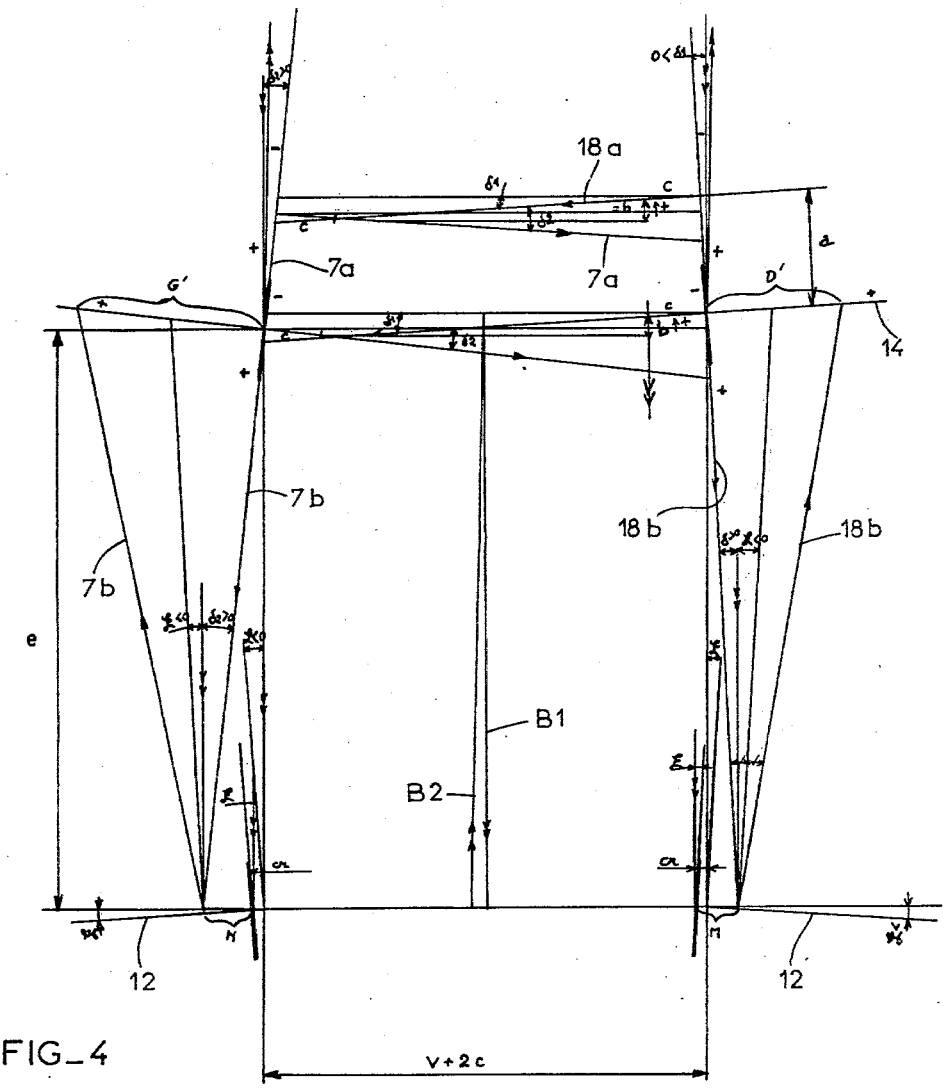
FIG_4

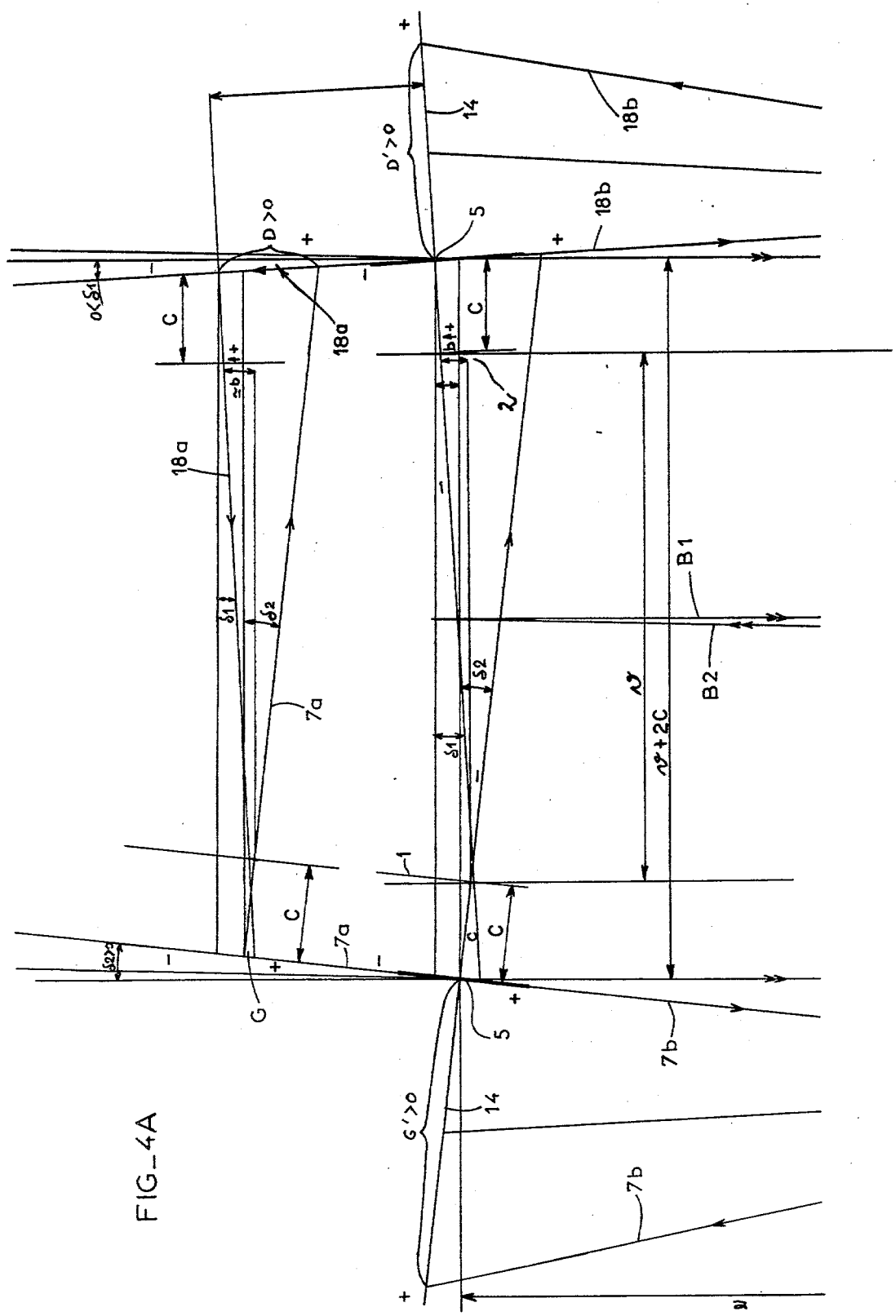
FIG.—4A

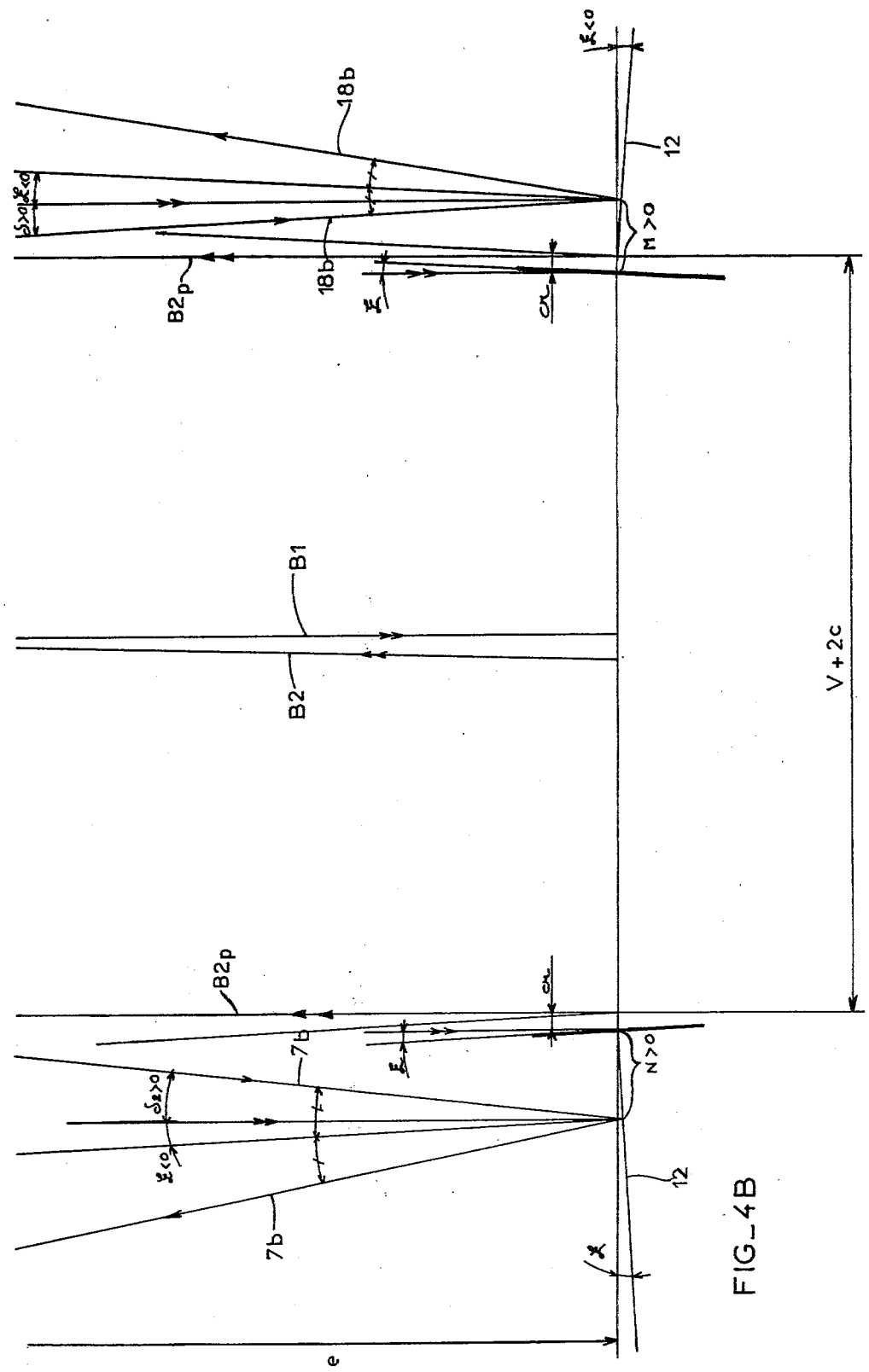

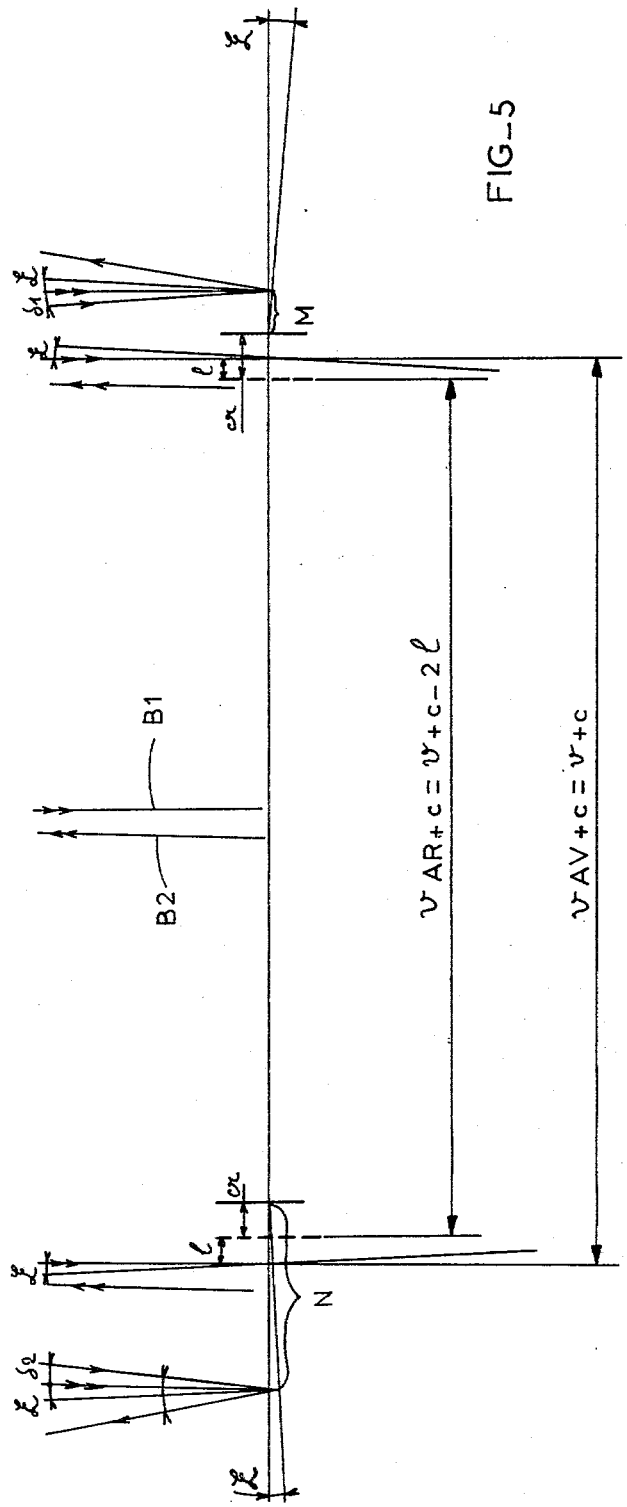
FIG_5
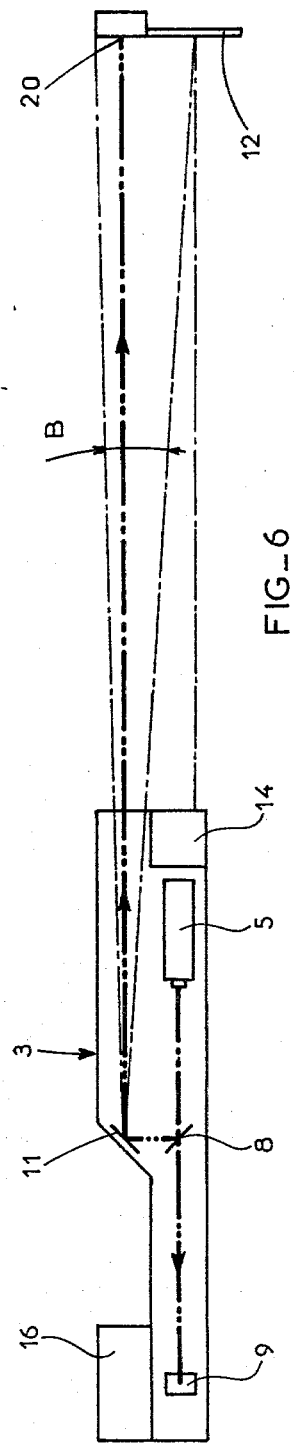
FIG_6

METHOD FOR CHECKING WHEEL ALIGNMENT OF FRONT AND REAR WHEEL SYSTEMS OF AUTOMOTIVE VEHICLES AND AN APPARATUS FOR CARRYING OUT SAID METHOD

This invention relates to a method for checking the wheel alignment of the front and rear wheel systems of automotive vehicles as well as for measuring the relative axial displacement of the front wheels or "set-back".

As a complementary feature, the invention is directed to an apparatus for carrying out said method.

Different types of equipment and methods for checking the angles of toe-in or toe-out of the front and rear wheels of a vehicle are already known. In particular, one type of apparatus makes use of projectors placed in front of the vehicle. The projectors send light beams transversely with respect to the vehicle in front of the front wheels and longitudinal beams which are parallel to the front wheels of the vehicle and are reflected from mirrors placed at the level of the rear wheels.

Appliances of this type are subject to different disadvantages. In particular, they lack accuracy in the measurement of angles and can prove difficult to read in certain cases, especially if these appliances are exposed directly to sunlight.

Moreover, in order to carry out the known methods, it is first necessary to place the front wheels in alignment with the rear wheels by turning the steering-wheel of the vehicle until the two bisector-lines of the angles defined by the front and rear wheels are caused to coincide by means of a suitable lighting device.

The aim of the invention is to overcome these disadvantages by proposing a method for carrying out the different angle measurements both rapidly and with enhanced accuracy irrespective of the conditions of lighting of the vehicle.

In the method according to the invention, a laser beam emitter is placed at the level of each front wheel and a first laser beam is projected transversely in front of the vehicle onto a first receiver placed in front of the other front wheel. A second laser beam emerging from the same emitter is projected onto a reflecting mirror placed at the level of the corresponding rear wheel and the reflected laser beam is transmitted to a second receiver. The distance between the point of impact of the laser beam and a zero reference point is then read on each receiver associated with a laser emitter. These values are entered into an electronic computer which processes the data as well as the wheel base and track measurements of the vehicle so as to determine the angles of toe-in or toe-out of the front and rear wheels, and the "set-back" value.

The apparatus for the practical application of the method according to the invention comprises in the case of each front wheel a horizontal arm which is supported by the corresponding wheel and within which is placed a laser emitter associated with a beam-splitter plate. The design function of said plate is to subdivide the laser beam into a first horizontal beam located in the direction of the initial emitted beam and reflected from a mirror at right angles in the transverse direction in front of the vehicle, and a second beam reflected horizontally at right angles from a second mirror to a third mirror carried by the corresponding rear wheel. The first beam impinges upon a first receiver mounted opposite to the first mirror on the end of the arm carried by the other front wheel and the second laser beam impinges upon a second receiver mounted on the same arm. The apparatus comprises an electronic computer programmed for automatically determining the angle values relating to alignment of the front and rear wheels as well as to the "set-back" on the basis of data recorded on the receivers.

In an advantageous form of construction, the four receivers mounted on the arms are diode strips.

Thus in order to determine the different parameters involved, it is only necessary to read the distances on the receivers between the points of impact of the laser beams and the zero reference points; the electronic computer determines the angles of toe-in or of toe-out from the distances read on the receivers.

The use of laser emitters makes it possible to carry out the measurements with a very high degree of accuracy irrespective of the lighting conditions.

Further properties and advantages of the invention will become apparent from the following description. Two embodiments of the method and of the apparatus according to the invention are illustrated in the accompanying drawings which are given by way of example without any limitation being implied, and in which:

FIG. 1 is a simplified view in perspective showing the front and rear wheel systems of a vehicle, to which are attached the constituent elements of a first embodiment of the apparatus according to the invention;

FIG. 2 is a view, partly in perspective and to a larger scale, showing the apparatus of FIG. 1;

FIG. 3 is a schematic view in elevation showing one arm of the apparatus of FIG. 2 and representing the optical paths of the laser beams emitted from said arm;

FIG. 4 is a schematic diagram providing a simplified representation of the optical paths of the laser beams as well as certain angles which can be determined by means of the apparatus for carrying out the method according to the invention;

FIG. 4A is a half-view to a larger scale corresponding to the top half of FIG. 4 and consequently relating to the front wheel system of the vehicle;

FIG. 4B is a view to a larger scale which is similar to FIG. 4A and corresponds to the rear wheel system of the vehicle;

FIG. 5 is a view which is similar to FIG. 4B and illustrates the different angles to be measured in the case in which the rear track or wheel-gage of the vehicle is different from its front track;

FIG. 6 is a schematic view in longitudinal elevation which is similar to FIG. 3 and shows a second embodiment of the apparatus according to the invention for measurement of "crabbing" or in other words the distance between the lines bisecting the angles determined by the front wheels and rear wheels when these latter are parallel;

FIG. 7 is a view partly in perspective, showing a rear wheel provided with a receiver according to the second embodiment illustrated in FIG. 6.

Referring first to FIGS. 1 to 3, there is shown a first embodiment of the apparatus contemplated by the invention for checking the alignment of the front and rear wheel systems of an automotive vehicle as well as for measuring the relative axial displacement or "set-back" between the front wheels.

For each of the front wheels 1,2, the apparatus comprises a substantially horizontal arm 3,4 which is supported by the corresponding wheel 1,2 and within which is placed a laser emitter 5. The casing of substantial length which constitutes the arm 3 or 4 is carried by the rim of the associated wheel by means of an attachment device 6 which is known per se and will therefore not be described.

Within each arm 3,4, the laser emitter 5 is oriented in such a manner as to emit a beam 7 towards the front end of the vehicle, said beam being practically horizontal. With each emitter 5 is associated a beam-splitter plate 8 which is capable of subdividing the laser beam 7 into a first horizontal beam 7a which passes through the plate and is located in the direction of the initial emitted beam 7 and is reflected from a first mirror 9 at right angles in a transverse direction in front of the vehicle. In the second place, the beam-splitter splitter plate 8 subdivides the initial beam 7 into a second beam 7b which makes an angle of 90° with the initial beam 7. Said beam 7b is in turn reflected at right angles from a second mirror 11 to a third mirror 12 carried by the corresponding rear wheel 13 (left rear wheel corresponding to the left front wheel 1).

As shown in FIGS. 1 and 2, the first beam 7a is reflected with an angle of incidence of 45° from the mirror 9 which is placed vertically. In consequence, the beam 7a reflected by the mirror 9 impinges upon a first receiver 16 mounted opposite to the first mirror 9 on that end of the arm 4 which is carried by the second front wheel 2. After horizontal reflection from the mirror 11 which is inclined to the vertical at 45°, the second laser beam 7b impinges upon a second receiver 14 mounted transversely on the arm 3,4. Each mirror 12 is supported by the associated rear wheel 13,15 by means of an attachment device 6 which is similar to the devices employed for attaching the arms 3 to the front wheels 1,2.

The beam-splitter plate 8 and the mirror 11 are each inclined at an angle of 45° with respect to the beam which impinges upon these latter in the example described. However, said plate and said mirror can be inclined at a different angle such that the beam reflected towards the rear of the vehicle always remains substantially horizontal. The only prerequisite condition is that the beam-splitter plate 8 and the mirror 11 are set at right angles to each other.

Each receiver 16 which is mounted on an arm 3 or 4 in front of the front wheels comprises a receiving element proper which is designated by the reference numeral 17. In the example which is illustrated, said receiving element is constituted by a horizontal strip of diodes which can consist of approximately one hundred diodes, for example. The same applies to the receivers 14.

Under these conditions, FIGS. 2 and 3 show in particular the optical paths followed by the two beams 7a and 7b which emerge from the beam-splitter plate 8. The first beam 7a is reflected at right angles by the mirror 9 and impinges upon the diodes strip 17 at a point of impact located at a distance from a zero reference point which is dependent among other factors on the angle of toe-in or toe-out of the left front wheel 1. The same applies to the laser beam 18a which emerges from the arm 4 carried by the right front wheel 2.

The second beam 7b reflected from the mirror 12 is received on the strip of diodes of the receiver 14 at a certain distance from a reference point, the same process being repeated in the case of the mirror 12 (not shown) which is associated with the right rear wheel 15.

The apparatus according to the invention further comprises an electronic computer (not shown) which is programmed so as to determine automatically the angle values relating to the alignment of the front and rear wheels 1,2, 13,15 as well as the "set-back" from data recorded on the receivers 14 and 16.

The "set-back" is defined as the relative displacement which exists between the front wheels. Thus the right front wheel may be displaced either in the forward or backward direction with respect to the left front wheel.

Each arm 3,4 is equipped with a scanning device whereby the laser beams carry out an angular scan in a plane perpendicular to its axis. Thus it is apparent from FIG. 2 that the transverse beam 7a issuing from the emitter 5 carried by the left front wheel can perform an angular scan A in a vertical plane, with the result that said beam can impinge upon the diodes of the strip 17 irrespective of the rake of the front wheel 1. So far as the rearwardly directed second beam 7b is concerned, said beam can carry out a scan B (as shown in FIG. 3), the limits of which correspond to the limits of the reflecting mirror 12.

Referring now to FIG. 4, the set of parameters which can be controlled by means of the equipment hereinabove described will now be defined.

Definition of angle values and other parameters which can be measured by means of the apparatus according to the invention:

There are shown in a horizontal plane in FIG. 4 the optical paths followed by the laser beams 7a, 7b emanating from the emitter 5 carried by the left front wheel 1. The same laser beams emanating from the emitter 5 carried by the right front wheel 2 are designated respectively by the references 18a and 18b.

The following data will first be defined:

v is the track of the vehicle, that is, the distance between the vertical mid-planes of the wheels of the same axle;

c is the distance between the vertical mid-plane of a wheel and the parallel vertical plane which passes through the axis of the associated emitter 5 and contains the beams 7a, 7b located between the emitter 5 and the mirrors 9 and 12;

B1 is the line bisecting the angle defined by the vertical mid-planes of the rear wheels 13,15;

B2 is the line bisecting the angle defined by the vertical mid-planes of the front wheels 1,2.

In the diagram of FIG. 4, the bisector-line B1 carries a double arrow which is directed towards the rear and the same applies to all the straight lines which are parallel to said bisector-line B1.

The bisector-line B2 and all the straight lines which are parallel to said bisector-line B2 are designated by a double arrow directed towards the front end of the vehicle.

The reference e is the wheel base of the vehicle or in other words the distance between the front and rear axles.

In FIGS. 4, 4A and 4B, the following parameters are also shown:

D = distance between the point of impact of the first laser beam 7a and the zero reference defined by the point at which the laser impact would be located if the angles of toe-in or toe-out of the front wheels were zero and if the vehicle had zero "set-back".

In FIG. 4A, it is apparent that the value D is equal to the distance between the point of impact of the beam 7a and the point of incidence at right angles of the beam 18a on the reflecting mirror 9 which is placed at the front end of the corresponding arm.

The distance G is equivalent to the value D read on the receiver 16 of the arm 3 carried by the left front wheel.

The value D' is the distance recorded on the second receiver 14 which forms part of the arm 4 carried by the right front wheel 2, between the point of impact of the laser beam 18b reflected from the mirror 12 placed at the level of the right rear wheel and a zero reference point defined by the intersection of the vertical plane containing the laser beam 18b prior to reflection from the mirror 12, and of the vertical plane of the second receiver 14. Said value D' is shown in FIG. 4A.

G' is the distance equivalent to the value D' and recorded on the second receiver 14 placed at the level of the left front wheel 1.

N is the distance between the point of impact of the beam 7b on the mirror 12 and the vertical plane which is parallel to the vertical mid-plane of the left rear wheel and is separated therefrom by the distance c (as shown in FIG. 4).

M (FIG. 4B) is the distance corresponding to N in the case of the right rear wheel.

Differences in angle values and parameters to be checked:

$\delta 1$ = angle of toe-in (positive) or toe-out (negative) of the right front wheel $\delta 2$ = angle of toe-in (positive) or toe-out (negative) of the left front wheel $2\xi$ = total angle value of toe-in or toe-out of the wheels of the rear-wheel system; these angles are considered by convention as either positive or negative as a function of their location on each side of lines parallel to the bisector-line B1 which constitutes the axis of thrust of the vehicle.

In FIG. 4A, it is apparent that $\delta 1$ is located within the line parallel to the bisector B1 which passes through the point of emission of the laser emitter 5 and that $\delta 1$ is consequently positive. Similarly, it is apparent that $\delta 2$ is located within a line parallel to the bisector B1 which passes through the point of emission of the laser beam and is consequently positive.

The angle $\xi$ in the case of the left rear wheel extends from the exterior of the line parallel to the bisector B1 which passes through the point of reflection from the mirror 12, of the beam 7b produced by the emitter 5 which is associated with the left front wheel, with the result that the left rear wheel has an angle of toe-out. The right rear wheel is disposed in the same manner.

The value b represents the relative displacement between the two front wheels (as shown in FIG. 4A) or "set-back" which is considered for example as positive if the right front wheel is displaced in the forward direction with respect to the left front wheel, and as negative in the contrary case.

In the example illustrated, b is positive since the right front wheel is displaced in the forward direction with respect to the left front wheel.

Thus the values read on the receivers are D, G, D', G' with the signs shown in FIG. 4A.

It can be demonstrated geometrically that, under these conditions, the following equations can be defined to within infinitely small values:

$$D = (v+2c)\delta 2 + b + (\delta 1 - \delta 2)c$$

$$G = (v+2c)\delta 1 - b - (\delta 1 - \delta 2)c$$

$$D' = 2e(\delta 1 - \xi)$$

$$G' = 2e(\delta 2 - \xi)$$

the solutions of these equations being as follows:

$$\delta 1 = \frac{D+G}{2(v+2c)} + \frac{D'-G'}{4e}$$

$$\delta 2 = \frac{D+G}{2(v+2c)} - \frac{D'-G'}{4e}$$

$$2\xi = \frac{D+G}{v+2c} - \frac{D'+G'}{2e}$$

$$b = \frac{D-G}{2} + \frac{v(D'-G')}{4e}$$

All these operations are performed automatically by the programmed computer which forms part of the apparatus according to the invention. The results of the angles of toe-in or toe-out of the front-wheel system and of the rear-wheel system as well as the "set-back" value b are displayed on a video screen, these angles being given in degrees and minutes.

It is worthy of note that the lateral displacement c arises from the half-width of a tire as shown, from the width of the projector holder but also from the half-width of the projector. By way of numerical example, the lateral displacement c arising from a projector holder, from a half-width of projector and from a half-width of tire can be approximately 205 mm.

In the case of each vehicle, the following factors are fed into the memory of the computer: track v, wheel base e, total angle of toe-in or toe-out of the front wheels with the tolerance in degrees given by the manufacturer, total angle of toe-in or toe-out of the rear wheels with the tolerance in degrees given by the manufacturer; the values just mentioned can be fed in the form of maximum-minimum dimensions.

The apparatus displays the values of $\delta 1$, $\delta 2$, $2\xi$, b on the video screen.

An important advantage of the method and of the apparatus for checking wheel alignment as described in the foregoing lies in the fact that it dispenses with any need to carry out preliminary alignment of the front wheels with the rear wheels by causing their two bisector-lines B1 and B2 to coincide, thus reducing the time required for measuring the different angles and simplifying operations.

In the case of each vehicle tested, the computer memory contains the ranges of values between which the parameter under consideration must normally be situated. In consequence, the corrections to be made on the screen can also be displayed as a function of the differences between the values recorded and the limits of the tolerance ranges laid down by the manufacturer.

The following table is thus obtained:

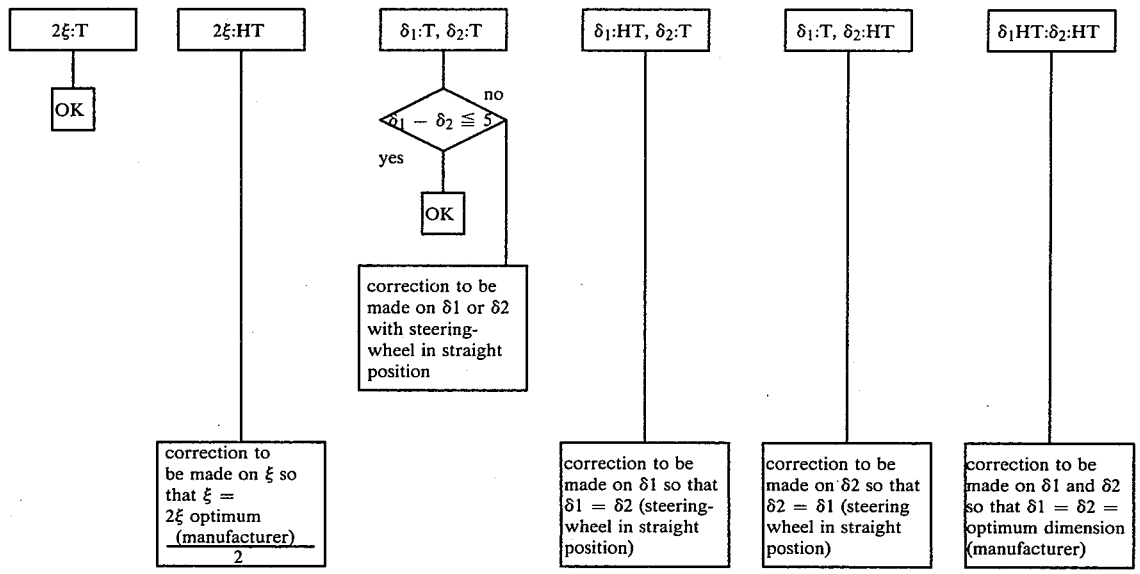

It is also possible to employ the apparatus and the method according to the invention for truing a warped vehicle wheel such as a front wheel, for example. To this end, the procedure is as follows:

The vehicle is lifted and the front wheel is rotated in the direction of forward travel of the vehicle. By means of the values D' (or G') which are read on the receiver, the mean value $\delta1_{mean}$ (or $\delta2_{mean}$) is determined, given the fact that ξ remains constant during this operation:

$$D' = 2e (\delta1 - \xi)$$

$$\delta1_{mean} = \frac{D' \max + D' \min}{4e} + \xi$$

$$G' = 2e (\delta2 - \xi)$$

$$\delta2_{mean} = \frac{G' \max + G' \min}{4e} + \xi$$

Rotation of the wheel is then continued until this latter is in the position of $\delta1_{mean}$ (or $\delta2_{mean}$). The vehicle is then lowered onto the ground with the wheel in this position, whereupon the mean warpage is horizontal and the maximum warpage is vertical, thus preventing any influence on the wheel alignment.

In order to carry out truing of a warped rear wheel, the operation is carried out in a practically similar manner as follows:

The vehicle is lifted, the rear wheels are rotated in the direction of forward travel of the vehicle, then by means of the values D' (or G') which are read on the receivers, $\xi_{mean}$ is determined for each rear wheel, given the fact that $\delta1$ ($\delta2$) is constant during the operation:

$$D' = 2e (\delta1 - \xi)$$

$$\xi_{mean} = \delta1 - \frac{D' \min + D' \max}{4e}$$

(right rear wheel)

$$G' = 2e (\delta2 - \xi)$$

$$\xi_{mean} = \delta2 - \frac{G' \min + G' \max}{4e}$$

(left rear wheel)

There is shown in FIGS. 6 and 7 a second embodiment of the apparatus for checking an additional parameter known as "crabbing" in addition to the angle parameters mentioned above and the "set-back" value.

The "crabbing" value cr is a distance expressed in millimeters and equal to the distance between the lines B1 and B2 bisecting the angles determined by the front and rear wheels when these bisector-lines are parallel. The bisecting line of the angle formed by the front wheels, when that line is parallel to B1, is referenced B2p on FIG. 4B; on this figure one can also see the value of "crabbing" designated as "cr".

"Crabbing" of the left rear wheel is negative when this wheel is displaced towards the left with respect to the left front wheel and when the front and rear track dimensions are identical as is the case in FIG. 4B. Said lateral displacement is clearly the same in the case of the right rear wheel. This means that, in the final analysis, the bisector formed on the rear wheels is on the left of the bisector formed on the front wheels when said bisectors are parallel.

In order to permit measurement of "crabbing", the mirrors 12 of the rear wheels are completed by diode strips 20 (as shown in FIGS. 6 and 7) which can be scanned by the corresponding laser beam 7b (or 18b).

The signals delivered serve to determine the distances N and M (FIG. 4B).

It can in fact be established that:

$$N = e\delta2 + cr + 1$$

$$M = e\delta1 - cr + 1$$

The "crabbing" value cr being expressed in millimeters with $$1 = \frac{\text{front track} - \text{rear track}}{2}$$

which makes it possible to obtain the "crabbing" value $$cr = \frac{(N - M) - e(\delta 2 - \delta 1)}{2}$$

this value cr is also displayed on the video screen of the apparatus.

All the values which can thus be determined (angles of toe-in or toe-out of the front and rear wheels, "set-back" and "crabbing") can be additionally indicated on a printing machine which delivers a ticket at the same time as display of said values on the screen.

It is possible to store in the computer memory a file relating to the data of all the types of vehicles to be tested. When the operator has to check a vehicle having the characteristics contained in memory, he need only enter on a keyboard the code of the vehicle to be tested, whereupon the operator proceeds to the checking operation.

In the example illustrated in FIG. 5, there are shown the different angle values relating to a rear-wheel system in the case in which the front and rear tracks of the vehicle are different. Since l is one-half of the difference between the front track and the rear track, we have in this case:

rear track $+c=v+c-2l$ front track $+c=v+c$

The invention is not limited to the embodiments hereinabove described and may accordingly be extended to many alternative forms of execution.

In order to avoid storage of data for each type of vehicle to be tested, it is also possible to carry out a manual keyboard entry of the characteristics of the vehicle to be checked.

By means of this apparatus, it is also possible to record variations in wheel alignment in respect of different states of compression of the vehicle suspension in order to permit adjustment of the steering rack.

What is claimed is:

1. A method for checking the wheel alignment of the front and rear wheel systems of automotive vehicles as well as for measuring the relative axial displacement or "set-back" of the front wheels, wherein a laser beam emitter is placed at the level of each front wheel and a first laser beam is projected transversely in front of the vehicle onto a first receiver placed in front of the other front wheel whilst a second laser beam produced by the same emitter is projected onto a reflecting mirror placed at the level of the corresponding rear wheel and the second laser beam thus reflected is transmitted to a second receiver, the distance between the point of impact of the laser beam and a zero reference point being then read on each receiver associated with a respective laser emitter, the read values being entered into an electronic computer which processes the data as well as the wheel base and track measurements of the vehicle so as to determine the angles of toe-in or toe-out of the front and rear wheels, and the "set-back" value, said computer computing the following angle values:

$\delta 1 =$ angle of toe-in or toe-out of the right front wheel, $\delta 2 =$ angle of toe-in or toe-out of the left front wheel, $2\xi =$ total angle value of toe-in or toe-out of the wheels of the rear-wheel system, all of said angles being considered by convention as either positive or negative as a function of their location on each side or lines parallel to the line bisecting the angle made by the vertical axial planes of the rear wheels, said bisecting line being such as to constitute the axis of thrust of the vehicle, b = relative displacement between the two front wheels, considered as positive if the right front wheel is displaced in the forward direction with respect to the left front wheel and negative in the contrary case, said relative displacement being defined as "set-back", c = distance between the axial planes of the front wheels and the vertical planes containing the associated laser beams, v = track, e = wheel base of the vehicle, the following data being recorded respectively on the first and the second receivers each associated with the respective laser emitter:

D = distance between the point of impact of the first laser beam and the zero reference defined by the point at which the laser impact would be located if the angles of toe-in or toe-out of the front wheels were zero and if the vehicle had zero set-back, G = distance equivalent to D and recorded on the receiver placed in front of the second front wheel such as the left wheel, for example, D' = distance recorded on the second receiver associated with the right front wheel, between the point of impact of the laser beam reflected from the mirror placed at the level of the right rear wheel and a zero reference point defined by the intersection of the vertical plane containing the laser beam and the vertical plane of the second receiver, G' = distance equivalent to D' and recorded on the second receiver placed at the level of the left front wheel, and the four following equations being solved in the electronic computer:

$D = (v + 2c)\delta 2 + b + (\delta 1 - \delta 2)c$ $G + (v + 2c)\delta 1 - b - (\delta 1 - \delta 2)c$ $D' = 2e(\delta 1 - \xi)$ $G' = 2e(\delta 2 - \xi),$ the solutions of these equations being as follows:

$\delta 1 = \frac{D + G}{2(v + 2c)} + \frac{D' - G'}{4e}$ $\delta 2 = \frac{D + G}{2(v + 2c)} - \frac{D' - G'}{4e}$ $2\xi = \frac{D + G}{v + 2c} - \frac{D' + G'}{2e}$ $b = \frac{D - G}{2} + \frac{v(D' - G')}{4e}.$ 2. A method according to claim 1 in which a warped front wheel is subjected to a truing operation, wherein the vehicle is lifted, the front wheel is rotated in the direction of forward travel of the vehicle and the value $\delta 1_{mean}$ (or $\delta 2_{mean}$) is determined by means of the values D' (or G') which are read on the receivers, given the fact that $\xi$ remains constant during this operation:

$D' = 2e(\delta 1 - \xi)$ $$\delta 1_{mean} = \frac{D'\max + D'\min}{4e} + \xi$$

$$G' = 2e(\delta 2 - \xi)$$

$$\delta 2_{mean} = \frac{G'\max + G'\min}{4e} + \xi$$

rotation of the wheel being then continued until said wheel is in the position of $\delta 1_{mean}$ ($\delta 2_{mean}$), the vehicle being then lowered onto the ground with the wheel in this position, whereupon the mean warpage is horizontal and the maximum warpage is vertical, thus preventing any influence on the wheel alignment.

3. A method according to claim 1 or claim 2 in which a warped rear wheel is subjected to a truing operation, wherein the vehicle is lifted, the rear wheel is rotated in the direction of forward travel of the vehicle and the value $\xi_{mean}$ is determined for each rear wheel by means of the values D' (or G') which are read on the receivers, given the fact that $\delta 1$ ($\delta 2$) is constant during the operation:

$$D' = 2e(\delta 1 - \xi)$$

$$\xi_{mean} = \delta 1 - \frac{D'\min + D'\max}{4e}$$

(right rear wheel)

$$G' = 2e(\delta 2 - \xi)$$

$$\xi_{mean} = \delta 2 - \frac{G'\min + G'\max}{4e}$$

(left rear wheel)

* * * * *